(12) United States Patent
Wentworth et al.

(10) Patent No.: US 10,675,933 B2
(45) Date of Patent: Jun. 9, 2020

(54) SUSPENSION CONTROL ARM ASSEMBLY

(71) Applicants: Thomas F. Wentworth, Sterling Heights, MI (US); Gregory A Sbroglia, Farmington Hills, MI (US)

(72) Inventors: Thomas F. Wentworth, Sterling Heights, MI (US); Gregory A Sbroglia, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 154 days.

(21) Appl. No.: 15/945,204

(22) Filed: Apr. 4, 2018

(65) Prior Publication Data
US 2019/0308475 A1 Oct. 10, 2019

(51) Int. Cl.
*B60G 7/00* (2006.01)
*B60G 13/00* (2006.01)

(52) U.S. Cl.
CPC ............. *B60G 7/001* (2013.01); *B60G 7/005* (2013.01); *B60G 13/00* (2013.01); *B60G 2204/148* (2013.01); *B60G 2204/41* (2013.01); *B60G 2204/416* (2013.01)

(58) Field of Classification Search
CPC ........ B60G 7/001; B60G 13/00; B60G 7/005; B60G 2204/416; B60G 2204/148; B60G 2204/41
See application file for complete search history.

(56) References Cited

U.S. PATENT DOCUMENTS

| 5,286,052 | A | | 2/1994 | Lukianov | |
|---|---|---|---|---|---|
| 5,601,304 | A | | 2/1997 | Tilly et al. | |
| 5,775,719 | A | * | 7/1998 | Holden | B60G 7/02 280/86.75 |
| 5,967,536 | A | * | 10/1999 | Spivey | B60G 7/001 280/124.141 |
| 6,398,240 | B1 | | 6/2002 | Taylor | |
| 6,446,991 | B1 | | 9/2002 | Klais | |
| 6,793,228 | B2 | * | 9/2004 | Zadok | B60G 3/06 280/124.134 |
| 7,083,176 | B2 | * | 8/2006 | Soles | B60G 7/02 280/86.751 |
| 9,186,944 | B2 | * | 11/2015 | Luttinen | B60G 3/04 |
| 2008/0304906 | A1 | * | 12/2008 | Maj | F16B 5/0241 403/408.1 |
| 2010/0038876 | A1 | | 2/2010 | Bunker | |
| 2015/0035246 | A1 | * | 2/2015 | Noble | B60G 3/20 280/124.13 |
| 2018/0147903 | A1 | * | 5/2018 | Neu | B60G 7/001 |
| 2019/0017541 | A1 | * | 1/2019 | Byrnes, Jr. | F16C 11/0671 |
| 2019/0241035 | A1 | * | 8/2019 | Wolf-Monheim | B60G 3/06 |

FOREIGN PATENT DOCUMENTS

DE 102018201670 A1 * 8/2019 ............... B60G 3/06

* cited by examiner

*Primary Examiner* — Darlene P Condra
(74) *Attorney, Agent, or Firm* — Ralph E. Smith

(57) ABSTRACT

A control arm assembly for a suspension system of a vehicle includes a base member configured to couple to a structural member of the vehicle via at least one isolator, and a control arm pivotally coupled to the base member and configured to couple to a steering knuckle of the vehicle, such that kinematics acting on the control arm are decoupled from an isolation provided by the coupling between the base member and the vehicle structural member.

15 Claims, 2 Drawing Sheets

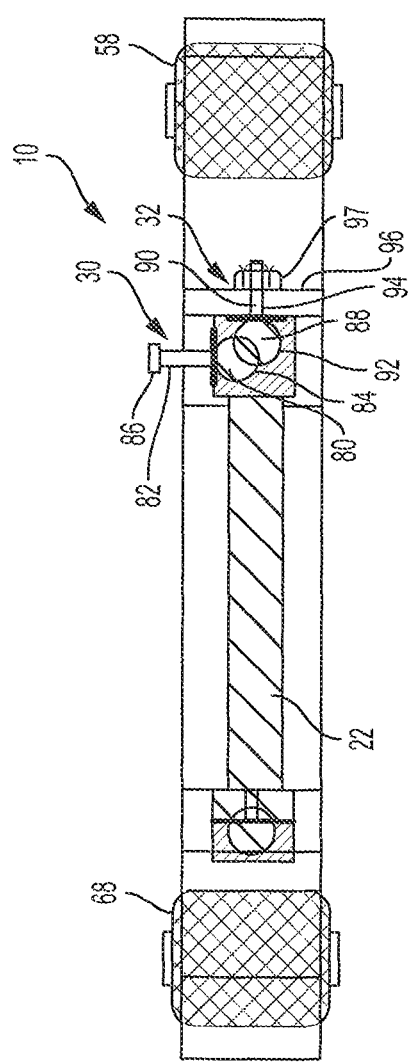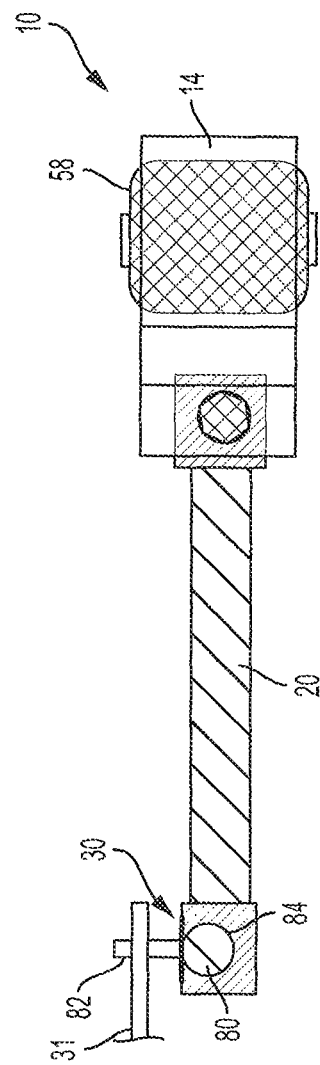

SUSPENSION CONTROL ARM ASSEMBLY

FIELD

The present application relates generally to vehicle suspension systems and, more particularly, to a lower control arm assembly for a vehicle suspension system.

BACKGROUND

Vehicle suspension systems typically include upper and lower control arms to maintain a wheel assembly in a proper orientation. The lower control arms are typically L-shaped members with front and rear arm portions connected to a vehicle chassis through associated front and rear pivot bushings. However, with such suspension systems, there is often a conflict between providing a stiff suspension to enhance vehicle safety and stability, and a soft suspension to absorb road roughness and improve passenger comfort. Accordingly, while such systems work well for their intended purpose, it is desirable to provide improved vehicle suspension systems.

SUMMARY

In accordance with one example aspect of the invention, a control arm assembly for a suspension system of a vehicle is provided. The assembly includes, in one exemplary implementation, a base member configured to couple to a structural member of the vehicle via at least one isolator, and a control arm pivotally coupled to the base member and configured to couple to a steering knuckle of the vehicle, such that kinematics acting on the control arm are decoupled from an isolation provided by the coupling between the base member and the vehicle structural member.

In addition to the foregoing, the described control arm assembly may include one or more of the following: wherein the control arm is pivotally coupled to the base member via at least one ball joint assembly; wherein the control arm is pivotally coupled to the base member via a first ball joint assembly and a second ball joint assembly; and wherein the control arm is coupled to the steering knuckle via a third ball joint assembly.

In addition to the foregoing, the described control arm assembly may include one or more of the following: wherein the control arm is generally triangular and includes a lateral member, a rearwardly extending rib member, and a structural support member extending between the lateral member and the rearwardly extending rib member; and wherein the lateral member is oriented to extend along a generally cross-car direction and includes a first end and a second end, wherein the lateral member first end includes a first socket to receive a first ball joint assembly configured to couple to the steering knuckle, and wherein the lateral member second end includes a second socket to receive a second ball joint assembly configured to pivotally couple the control arm to the base member.

In addition to the foregoing, the described control arm assembly may include one or more of the following: wherein the rearwardly extending rib member includes a first end and a second end, wherein the rearwardly extending rib member first end is coupled to the lateral member first end, and wherein the rearwardly extending rib member second end includes a third socket to receive a third ball joint assembly configured to further pivotally couple the control arm to the base member; and wherein the structural support member includes a first end coupled to the lateral member second end, and a second end coupled to the rearwardly extending rib member second end.

In addition to the foregoing, the described control arm assembly may include one or more of the following: wherein the base member is generally bar-like and includes a forward end and an opposite rearward end, the forward end configured to be oriented toward a front of the vehicle, and the rearward end configured to be oriented toward a rear of the vehicle; wherein the base member forward end includes a forward aperture, and the base member rearward end includes a rearward aperture; wherein the at least one isolator includes a front isolator disposed in the forward aperture, and a rear isolator disposed in the rearward aperture; wherein the front isolator is oriented such that an elastic axis of the front isolator is directed at a wheel center where loads are input into the vehicle suspension; wherein the rear isolator is oriented such that an elastic axis of the rear isolator is directed at the wheel center; wherein the front and rear isolators are elastomeric; and wherein the control arm does not include an isolator.

In accordance with another example aspect of the disclosure, a lower control arm assembly for a suspension system of a vehicle is provided. The assembly includes, in one exemplary implementation, a base member configured to couple to a structural member of the vehicle via a forward isolator and a rearward isolator disposed within the base member, and a control arm configured to couple to a steering knuckle via a first ball joint assembly. The control arm is pivotally coupled to the base member via second and third ball joint assemblies such that kinematics acting on the control arm are decoupled from an isolation provided by the forward and rearward isolators.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

BRIEF DESCRIPTION OF DRAWINGS

FIG. 2 is an inboard-looking side view of the control arm assembly shown in FIG. 1, in accordance with the principles of the present application; and FIG. 3 is a rear facing side view of the control arm assembly shown in FIG. 1, in accordance with the principles of the present application.

DESCRIPTION

Figure 1:
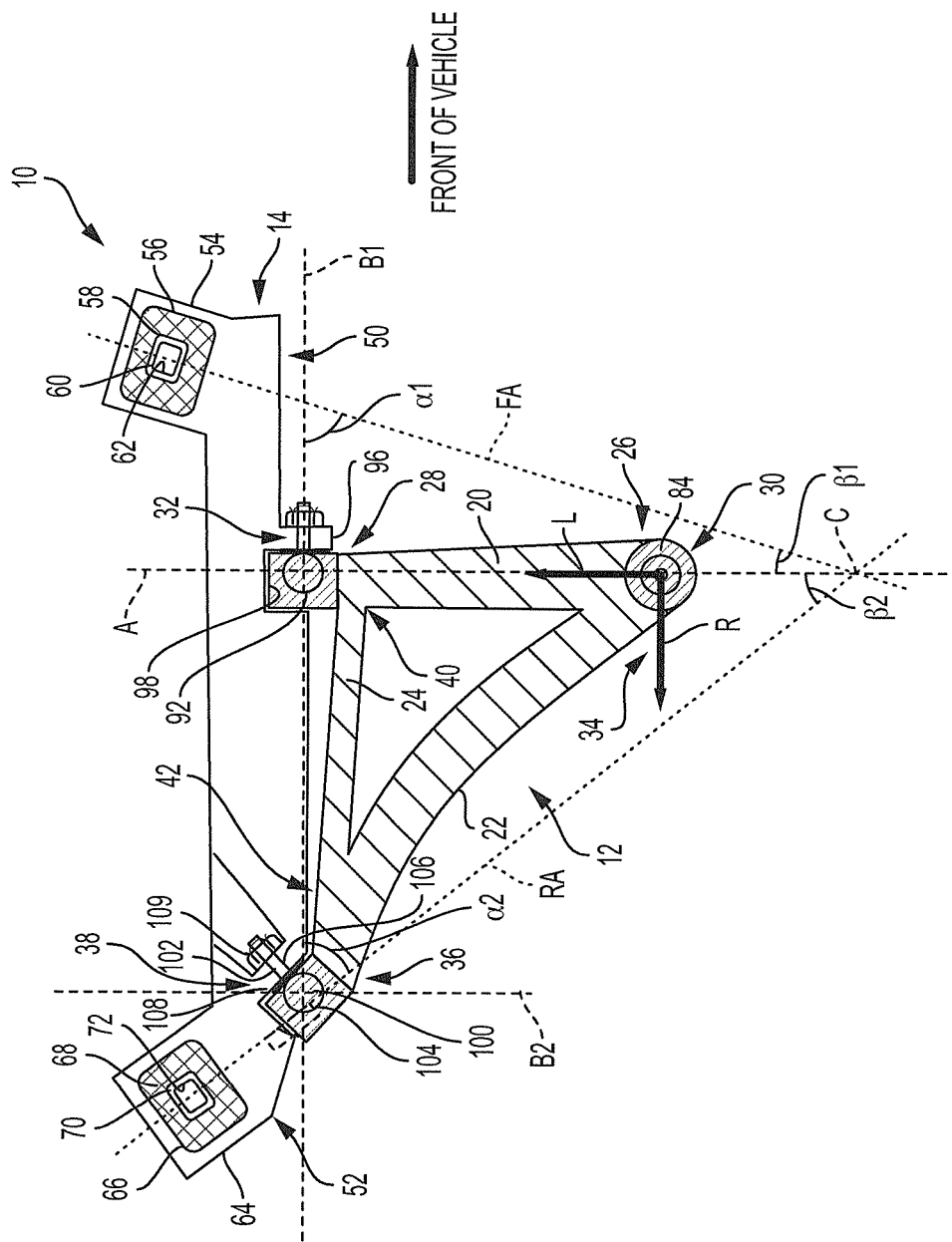
FIG. 1 is a plan view of an example control arm assembly in accordance with the principles of the present application.

The present application is generally directed to a lower control arm assembly for a suspension of a motor vehicle. In one example implementation, a ball joint is established at an inner pivot axis of the assembly to provide kinematic motion of the suspension. An inner pivot is attached to a structural sub-member that is subsequently attached to the vehicle body or frame with rubber isolators positioned and oriented to facilitate controlling deflection of the lower control arm and vibration energy transmitted to the body. In this way, the rubber isolators are not subjected to strain induced by suspension ride travel such that they can be positioned further fore and aft to reduce peak forces reacted by the isolators, thus resulting in improved vibration and noise isolation inside the vehicle. Moreover, elastic axes can be adjusted independently (e.g., by orientation of the isolator axes and rate selection) to control the recession rate and direction of the control arm due to bumps in the road, thereby providing for reduced deflection steer, steering feedback, and ride harshness.

Referring to FIG. 1, an example lower control arm assembly for use in a motor vehicle is generally shown and indicated at reference numeral 10. It will be appreciated, however, that the features described herein are not limited to lower control arm assemblies and may be utilized in other systems such as, for example, upper control arm assemblies. In the example embodiment, unlike conventional single-piece control arms, control arm assembly 10 is a two-piece assembly that generally includes a pivot or control arm 12 pivotally coupled a structural base member 14.

In the illustrated example, control arm 12 is generally triangular and includes a lateral member 20, a rearwardly extending rib member 22, and a fore-aft or structural support member 24 coupled therebetween. The lateral member 20 generally extends along a lateral cross-car direction 'A' and includes a first end 26 and an opposite second end 28. The first end 26 is operably associated with a first ball joint assembly 30 configured to couple to a vehicle steering knuckle 31 (see FIG. 3) in a manner known in the art. The second end 28 is operably associated with a second ball joint assembly 32 configured to partially pivotably couple the control arm 12 to the structural base member 14 about a first control arm pivot axis 'B1' that generally extends in a fore/aft direction of the vehicle.

The rearwardly extending rib member 22 is generally curved between a first end 34 and an opposite second end 36, for example, to provide clearance for a turning wheel. The first end 34 is coupled to the lateral member first end 26, and the second end 36 is operably associated with a third ball joint assembly 38 configured to further partially couple the control arm 12 to the structural base member 14 about the same pivot axis B1.

In the example embodiment, the structural support member 24 extends generally in the vehicle fore/aft direction and includes a first end 40 and an opposite second end 42. The first end 40 is coupled to the lateral member second end 28, and the second end 42 is coupled to the rearwardly extending rib member second end 36.

In the illustrated example, structural base member 14 is a generally bar-like member and includes a forward end 50 and an opposite rearward end 52. The forward end 50 includes a projection 54 extending therefrom that includes an aperture 56 to receive an elastomeric (e.g., rubber) front isolator 58. In the example embodiment, the front isolator 58 includes an inner sleeve 60 defining an inner aperture 62 configured to receive a fastener (not shown) to couple the front isolator 58 to the vehicle body or sub-frame (not shown).

In the example embodiment, the base member rearward end 52 includes a projection 64 extending therefrom that includes an aperture 66 to receive an elastomeric rear isolator 68. In one example, the rear isolator 68 includes an inner sleeve 70 defining an aperture 72 configured to receive a fastener (not shown) to couple the rear isolator 68 to the vehicle body or sub-frame.

In the example embodiment, the isolators 58, 68 have a generally rectangular cross-section. However, isolators 58, 68 may have any suitable shape that enables assembly 10 to function as described herein. The isolators 58, 68 are positioned and oriented to control deflection of the lower control arm assembly 10 and vibration energy transmitted to the vehicle body. Due to the pivoted connection between the control arm 12 and the base member 14, isolators 58, 68 are not subjected to strain induced by suspension ride travel. Accordingly, the isolators 58, 68 can be positioned further fore and aft (compared to conventional assemblies) to reduce peak forces reacted by the isolators, which facilitates improving vibration and noise isolation in the vehicle. In this way, isolator orientation and rates in various directions are tunable or adjustable to orient the elastic axes in any direction favorable to the task of controlling wheel motion and isolating forces transmitted to the vehicle frame/body or other structural member.

As shown in FIG. 1, the position and orientation of front isolator 58 defines a front isolator elastic axis 'FA' that is directed at the wheel center where loads are input into the suspension. As such, front isolator elastic axis 'FA' generally extends from a center of the front isolator 58 to an elastic center 'C' located at the wheel center. Similarly, the position and orientation of rear isolator 68 defines a rear isolator elastic axis 'RA' that is directed at the wheel center and which generally extends from a center of the rear isolator 68 to the elastic center 'C'.

In this way, the two-piece control arm assembly 10 enables tunability thereof. More specifically, the pivotable coupling between the control arm 12 and the base member 14 decouples the kinematics of the suspension from the isolation of the suspension to the body, which enables the elastic axes 'FA' and 'RA' to be adjusted independently (e.g., by orientation of the isolator axes and rate selection) to control the recession rate and direction of the control arm 12 due to bumps in the road, thereby providing for reduced deflection steer, steering feedback, and ride harshness.

In the example embodiment, the front isolator elastic axis 'FA' is disposed at an angle '$\alpha 1$' relative to the control arm pivot axis 'B1' and an angle '$\beta 1$' relative to the lateral cross-car direction 'A'. In a similar manner, the rear isolator elastic axis 'RA' is disposed at an angle '$\alpha 2$' relative to the control arm pivot axis 'B1' and an angle '$\beta 2$' relative to the lateral cross-car direction 'A'.

The first ball joint assembly 30 is configured to couple to the vehicle steering knuckle 31 in a conventional manner. The first ball joint assembly 30 generally includes a ball 80 coupled to one end of a stud 82. The ball 80 is configured for engagement with a mating socket 84 formed in the lateral member first end 26. The stud 82 is configured to extend through a bore (not shown) formed in the steering knuckle 31, and a locking nut 86 is then coupled to the threaded other end of stud 82. As shown in FIG. 3, in the example embodiment, the first ball joint assembly 30 is oriented in a generally up-down direction such that stud 82 extends from the ball 80 toward a roof of the vehicle.

The second ball joint assembly 32 is configured to enable pivoting movement of the control arm 12 relative the structural base member 14 about pivot axis B1 whenever the steering knuckle travels vertically (up and down) relative to base member 14 (e.g., vertical ride motion of the wheel and knuckle relative to the car body). In the example embodiment, the second ball joint assembly 32 generally includes a ball 88 coupled to one end of a stud 90. The ball 88 is configured for engagement with a mating socket 92 formed in the lateral member second end 28. The stud 90 is configured to extend through a bore 94 formed in a flange 96 extending from the base member 14, and a locking nut 97 is secured to the free end of the stud 90. Moreover, as shown in FIG. 1, base member 14 includes a recess 98 configured to at least partially receive the lateral member second end 28 therein. As shown in FIG. 1, in the example embodiment, the second ball joint assembly 32 is oriented in a generally fore-aft direction such that stud 90 extends from the ball 88 toward the front of the vehicle.

The third ball joint assembly 38 is configured to enable pivoting movement of the control arm 12 relative the structural base member 14 also about the pivot axis 'B1' when the steering knuckle travels vertically (up and down) relative to base member 14. In the example embodiment, third ball joint assembly 38 generally includes a ball 100 coupled to one end of a stud 102. The ball 100 is configured for engagement with a mating socket 104 formed in the rib member second end 36. The stud 102 is configured to extend through a bore 106 formed in a flange 108 extending from the base member 14, and a locking nut 109 is secured to the free end of the stud 102. Moreover, as shown in FIG. 1, in the example embodiment, the third ball joint assembly 38 is oriented at an angle relative to the fore-aft direction such that stud 102 extends from the ball 100 generally toward the front of the vehicle.

In operation, control arm assembly 10 takes the kinematic motion of the control arm 12 and allows the motion to be very precise around the forward and rearward ball joint assemblies 32, 38. Since bushings no longer need to be oriented in-line with the kinematic axis about which the steering knuckle rotates, they can be placed further away with a preferred orientation. Moreover, control arm 12 thus does not require isolators. In the disclosed assembly 10, loads received from the road surface are transferred through the ball joint assemblies 32, 38 into the structural base member 14. Because the lateral loads on the ball joint assemblies is not directly in-line with the front isolator 58, such loads are distributed through both isolators 58, 68 allowing the front isolator 58 to be softer than in typical systems, thereby improving passenger comfort. Additionally, rearward loads at the wheel center 'C', due to bumps in the road, will cause the tire and wheel assembly attached to the steering knuckle to steer outboard as the control arm assembly deflects rearward to the vehicle. Accordingly, isolators 58, 68 are configured such that this rearward force induces deflection of the structural base member 14 inboard at the front, and outboard at the rear thereby providing some compensation for the outboard steering tendency of the tire and wheel assembly.

Described herein are systems and methods for improving vehicle suspensions. The systems include a two-piece control arm assembly having a control arm pivotally coupled to a base member via one or more ball joint assemblies. The base member is coupled to a vehicle chassis/frame or other structural member and includes one or more elastomeric isolators.

The described system is configured to de-couple the kinematic suspension motion requirement from the isolators by providing this function with ball joints. The rubber isolators are then free to be located and positioned to optimize the functions of vibration isolation to the vehicle body and deflection control for road disturbances. Durability is improved by removing wind-up motion in conventional bushings due to suspension travel and lowering the force reacted by the isolators due to the increased fore-aft span between them providing a longer moment arm. Accordingly, deflection of the assembly due to road disturbances has a greater range of control to enable lower recession rates for improved harshness feel as well as counteract the steering moment generated during recession, thereby resulting in improved steering and control.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A control arm assembly for a suspension system of a vehicle, comprising:
    a base member configured to couple to a structural member of the vehicle via at least one isolator; and
    a control arm pivotally coupled to the base member and configured to couple to a steering knuckle of the vehicle, such that kinematics acting on the control arm are decoupled from an isolation provided by the coupling between the base member and the vehicle structural member,
    wherein the base member is generally a bar member and includes a forward end and an opposite rearward end, the forward end configured to be oriented toward a front of the vehicle, and the rearward end configured to be oriented toward a rear of the vehicle.

2. The assembly of claim 1, wherein the control arm is pivotally coupled to the base member via at least one ball joint assembly.

3. The assembly of claim 1, wherein the control arm is pivotally coupled to the base member via a first ball joint assembly and a second ball joint assembly.

4. The assembly of claim 3, wherein the control arm is coupled to the steering knuckle via a third ball joint assembly.

5. The assembly of claim 1, wherein the control arm is generally triangular and includes a lateral member, a rearwardly extending rib member, and a structural support member extending between the lateral member and the rearwardly extending rib member.

6. The assembly of claim 5, wherein the lateral member is oriented to extend along a generally cross-car direction and includes a first end and a second end,
    wherein the lateral member first end includes a first socket to receive a first ball joint assembly configured to couple to the steering knuckle, and
    wherein the lateral member second end includes a second socket to receive a second ball joint assembly configured to pivotally couple the control arm to the base member.

7. The assembly of claim 6, wherein the rearwardly extending rib member includes a first end and a second end,
    wherein the rearwardly extending rib member first end is coupled to the lateral member first end, and
    wherein the rearwardly extending rib member second end includes a third socket to receive a third ball joint assembly configured to further pivotally couple the control arm to the base member.

8. The assembly of claim 7, wherein the structural support member includes a first end coupled to the lateral member second end, and a second end coupled to the rearwardly extending rib member second end.

9. The assembly of claim 1, wherein the base member forward end includes a forward aperture, and the base member rearward end includes a rearward aperture.

10. The assembly of claim 9, wherein the at least one isolator includes a front isolator disposed in the forward aperture, and a rear isolator disposed in the rearward aperture.

11. The assembly of claim 10, wherein the front isolator is oriented such that an elastic axis of the front isolator is directed at a wheel center where loads are input into the vehicle suspension.

12. The assembly of claim 11, wherein the rear isolator is oriented such that an elastic axis of the rear isolator is directed at the wheel center.

13. The assembly of claim 10, wherein the front and rear isolators are elastomeric.

14. The assembly of claim 1, wherein the control arm does not include an isolator.

15. The assembly of claim 1, wherein the at least one isolator includes a forward isolator and a rearward isolator disposed within the base member; and
   wherein the control arm is configured to couple to the steering knuckle via a first ball joint assembly, and to the base member via second and third ball joint assemblies such that the kinematics acting on the control arm are decoupled from isolation provided by the forward and rearward isolators.

* * * * *